United States Patent [19]
Castrigno

[11] Patent Number: 5,732,079
[45] Date of Patent: Mar. 24, 1998

[54] METHOD AND APPARATUS FOR SKEWING THE START OF TRANSMISSION ON MULTIPLE DATA HIGHWAYS

[75] Inventor: Matthew Castrigno, Sunnyvale, Calif.

[73] Assignee: Cisco Technology, Inc., San Jose, Calif.

[21] Appl. No.: 577,883

[22] Filed: Dec. 22, 1995

[51] Int. Cl.[6] .................................................. H04J 3/02
[52] U.S. Cl. ....................................... 370/362; 370/438
[58] Field of Search ................................ 370/395, 431, 370/438, 439, 362, 357, 360, 363, 364, 442; 395/849, 853, 855, 856, 865; 364/222.2, 260, 260.2; 340/825.5, 825.51

[56] References Cited

U.S. PATENT DOCUMENTS

| | | | |
|---|---|---|---|
| 4,488,218 | 12/1984 | Grimes | 370/439 |
| 4,631,534 | 12/1986 | Franklin et al. | 370/439 |
| 5,416,910 | 5/1995 | Moyer et al. | 370/438 |
| 5,425,022 | 6/1995 | Clark et al. | 370/362 |
| 5,452,330 | 9/1995 | Goldstein | 370/438 |
| 5,535,197 | 7/1996 | Cotton | 370/395 |

*Primary Examiner*—Chau Nguyen
*Attorney, Agent, or Firm*—Blakely, Sokoloff, Taylor & Zafman

[57] ABSTRACT

A data processing system. The data processing comprises a data bus subdivided into a plurality of independent data paths and a plurality of system components coupled to the data bus. Each system component monitors each independent data path of the data bus to determine whether that system components is to receive data transmitted via that independent data path. An allocation control circuit coupled to the system components allocates a transmission opportunity spanning multiple bus clock cycles to a first system component such that the first system component is enabled to transmit data via any and all of the independent data paths during the transmission opportunity. The allocation control circuit enables the first system component to begin transmission of data over the data paths at different clock cycles of the transmission opportunity such that the plurality of system components need monitor only one independent data path per bus clock cycle.

5 Claims, 8 Drawing Sheets

MAPPING TABLE
900

| b \ n | 1 | 2 | 3 | 4 | 5 | 6 | 7 | 8 |
|---|---|---|---|---|---|---|---|---|
| 1 | X |   |   |   |   |   |   |   |
| 2 | X |   |   |   | X |   |   |   |
| 3 | X |   |   | X | X |   | X |   |
| 4 | X |   | X | X | X |   | X |   |
| 5 | X | X |   | X | X |   | X |   |
| 6 | X | X | X |   | X | X | X |   |
| 7 | X | X | X | X | X | X | X |   |
| 8 | X | X | X | X | X | X | X | X |

FIG. 9

METHOD AND APPARATUS FOR SKEWING THE START OF TRANSMISSION ON MULTIPLE DATA HIGHWAYS

FIELD OF THE INVENTION

The present invention relates generally to data buses and more particular to a time division multiplexed data bus architecture.

BACKGROUND

Time division multiplexed (TDM) data buses are desirable interconnects for many data processing systems because system components need not arbitrate for access to the data bus, which simplifies the system components and the overall interconnect. Each system component is allocated one or more "transmission opportunities" per "transmission cycle" wherein the transmission opportunities for a particular system component occur at the same position in each transmission cycle. For typical TDM buses, a transmission opportunity is defined as a "timeslot" wherein the duration of a timeslot is equal to one bus clock period.

For some prior data processing systems that use TDM buses, transmission opportunities are dynamically allocated in view of the configuration of the data processing system. For example, the data processing system and its system components may be scalable such that number of transmission opportunities required by a particular system component may change.

One disadvantage of such systems is that transmission opportunities are typically allocated to system components without regard to "placement" in the transmission cycle such that all of the transmission opportunities for a particular system component may be bunched together in one portion of the transmission cycle. The bunching of transmission opportunities increases the maximum time between transmission opportunities, which requires that the size of the output buffer memory of a system component be increased to ensure that data is not lost. The bunching of transmission opportunities also affects receiving components because a receiving component must be prepared to receive and store large amounts of data in a short period of time, which requires that the size of the input buffer memory of a system be increased to ensure that data is not lost.

SUMMARY AND OBJECTS OF THE INVENTION

Therefore, it is an object of the present invention to reduce the cost and complexity of a TDM interconnect.

These and other objects of the present invention are provided by a data processing system that comprises a data bus subdivided into a plurality of independent data paths and a plurality of system components coupled to the data bus. Each system component monitors each independent data path of the data bus to determine whether that system components is to receive data transmitted via that independent data path. An allocation control circuit coupled to the system components allocates a transmission opportunity spanning multiple bus clock cycles to a first system component such that the first system component is enabled to transmit data via any and all of the independent data paths during the transmission opportunity. The allocation control circuit enables the first system component to begin transmission of data over the data paths at different clock cycles of the transmission opportunity such that the plurality of system components need monitor only one independent data path per bus clock cycle.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 9 is a block diagram showing a look-up table that may be used by a network manger to automatically assign transmission opportunities of the system components.

DETAILED DESCRIPTION

A TDM data bus and its associated dynamic assignment and allocation scheme are described wherein the transmission opportunities assigned to a particular system component are spread evenly over an entire transmission cycle such that substantially the same amount of time is provided between each transmission opportunity of the system component. The assignment and allocation scheme is repeated for each system component. Therefore, the size of the input and output buffer memories of system components may be reduced, which reduces the cost of the system components.

As defined herein, the "assignment" of transmission opportunities refers to the manner in which the transmission opportunities within a transmission cycle are assigned to the system components. The "allocation" of transmission opportunities refers to the manner in which system components are informed that they may transmit data during a given bandwidth unit. One aspect of the disclosed data bus and assignment/allocation scheme is that a transmission opportunity is defined as a group of contiguous timeslots called a "bandwidth unit" or "BU," and transmission opportunities are allocated on a BU-by-BU basis such that the circuitry that allocates BUs need not operate at the speed of the TDM data bus.

Exemplary Data Processing System

Figure 1:
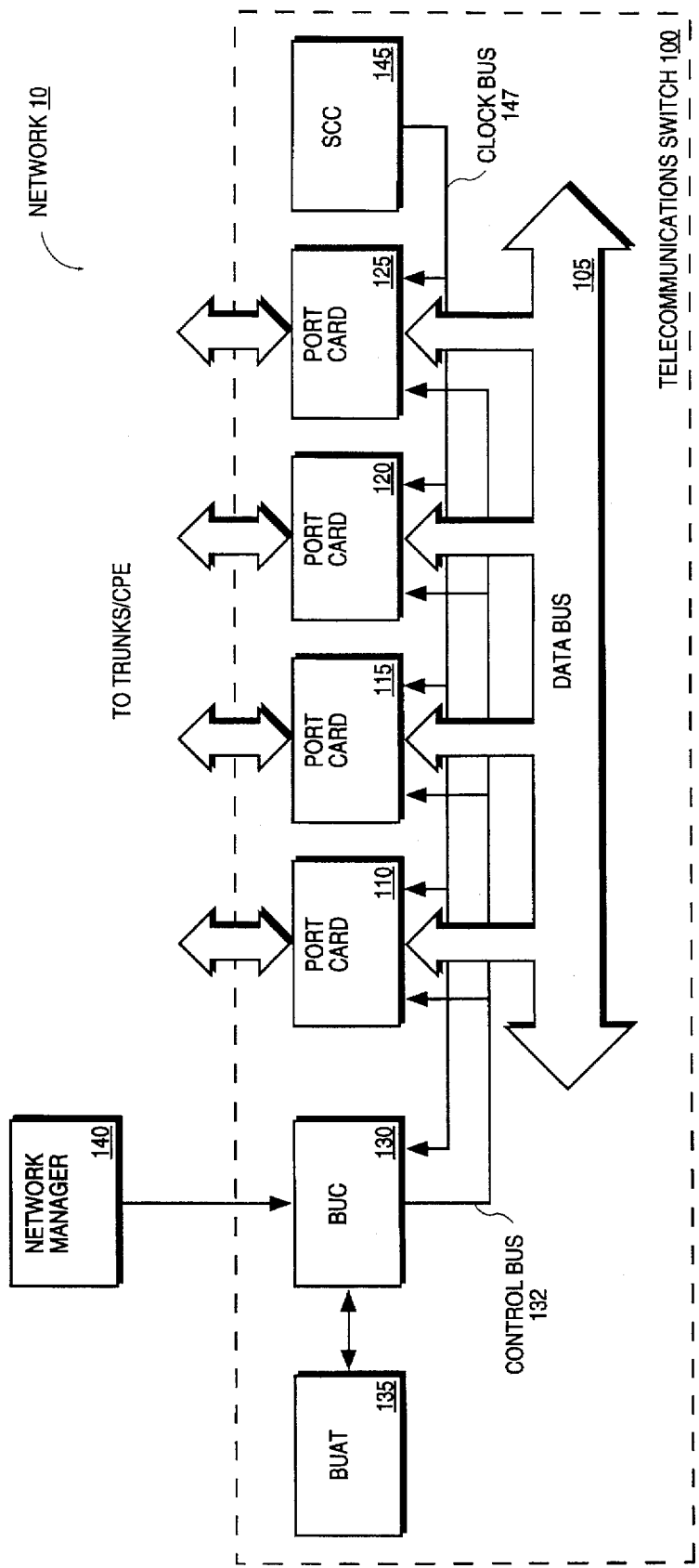
FIG. 1 shows a system that operates according to a present embodiment.

FIG. 1 shows a network 10 that includes a telecommunications switch 100 (hereinafter "switch 100") and a network manager 140. Switch 100 is scalable and includes an interconnect that operates according to a present embodiment. Network manager 140, which may be a personal computer or workstation that executes network management software, is provided to control network 10 and switch 100 using a network management protocol such as the Simple Network Management Protocol ("SNMP"). When SNMP is used to manage network 10, switch 100 includes an SNMP agent (not shown) that communicates configuration and resource information to network manager 10, which includes an SNMP manager that receives the information and that can manipulate the resources of switch 100. In addition to performing typical network management functions, network manager 140 is responsible for defining operation of the interconnect of switch 100 by assigning bandwidth units to system components in view of the configuration of switch 100. Accordingly, the configuration information of switch 100 includes the number of bandwidth units that may be assigned and the number of bandwidth units each system component requires. Network manager 140 may detect changes to the configuration of switch 100 automatically or in response to human user input.

Switch 100 includes a plurality of system components shown as port cards 110, 115, 120, and 125, each of which uses data bus 105 to exchange information with other port cards. According to the present embodiment, data bus 105 is a TDM bus implemented as a backplane wherein connectors (not shown) are provided for accepting the port cards such that port cards may be added and removed, as required. Each port card interconnects switch 100 with either 1) other telecommunications switches (not shown) via trunk line(s) or 2) customer premise equipment ("CPEs," not shown) such as private networks via network link(s). Each port card typically includes multiple ports (not shown) each for accepting a connection, and the number of ports that are actually connected may change over time such that the number of transmission opportunities that a port card requires per transmission cycle also changes.

According to the present embodiment, port cards 110, 115, 120, and 125 use data bus 105 to exchange fast packets and/or asynchronous transfer mode (ATM) cells between one another. Port cards that are connected to CPEs that do not natively support fast packet or ATM protocols segment packets received from their network link(s) or trunk line(s) into either fast packets or ATM cells. Fast packets and ATM cells are transported unchanged over data bus 105, and port cards read the information in the headers of each fast packet and ATM cell to determine whether they are the destination of the fast packet or ATM cell. For example, each of the receiving port cards reads the virtual channel identifier (VCI) and virtual path identifier (VPI) fields of an ATM cell header to determine whether that port card is to accept the ATM cell. Once a port card has accepted a fast packet or ATM cell, the port card reassembles it, if necessary, and forwards it as required. Data bus 105 is described in more detail below with respect to FIG. 2.

Allocating Bandwidth Units

Data transfers using data bus 105 are controlled by bandwidth unit controller (BUC) 130, which issues control signals to the port cards using control bus 132 to indicate which port card, if any, can transmit data during the next bandwidth unit. The number of bus clock periods (or timeslots) that comprise a single BU is determined by the width of data bus 105 and the amount of data that is to be transferred during a single BU. According to the present embodiment, data bus 105 comprises a 64-bit data path that is subdivided into four independent 16-bit data paths or "cell highways," wherein a single fifty-three (53) byte ATM cell or two twenty-four (24) byte fast packets may be transferred over each cell highway during a single BU, and wherein each BU is equal to twenty-eight (28) clock periods of the system clock signal BUSCLK, which has a frequency of 16.384 megahertz (MHz) and is supplied by a system clock controller (SCC) 145 via clock bus 147. The aggregate bandwidth of data bus 105 is therefore approximately equal to one gigabit per second (1 Gbps).

BUC 130 allocates bandwidth units to the port cards in response to information contained in bandwidth unit allocation table (BUAT) 135. As described below with respect to FIGS. 6–7, BUAT 135 comprises one or memory devices that are configured to store multiple pages of allocation table entries, wherein each table entry corresponds to one BU and wherein all of the pages of BUAT 135 define a single transmission cycle. During each bandwidth unit, BUC 130 reads the table entry pointed to by a table pointer, allocates the next BU to the port card indicated by the table entry, and increments the table pointer to point to the next table entry. Once all the entries of a current page have been read, the table pointer is incremented to point to the first entry of the next page. If the current page is the last page of BUAT 135 and the last entry of the current page has been read, the table pointer is reset to point to the first entry of the first page, and the next transmission cycle is begun. Allocating bus bandwidth on a BU-by-BU basis rather than on a timeslot-by-timeslot basis allows BUAT 135 to comprise slower memory devices because BUC 130 need only access BUAT 135 once every bandwidth unit (e.g. twenty eight clock periods) rather than once every timeslot (e.g. each clock period).

Network manager 140 dynamically assigns bandwidth units to a port card in view of the configuration of switch 100 by writing appropriate information in corresponding table entries of BUAT 135. For example, network manager assigns table entries (BUs) to each port card of switch 100 in view of the number of connected ports and the information rate of each connected port. According to the present embodiment, the contents of BUAT 135 are altered whenever the configuration of switch 100 is changed. According to alternative embodiments, the contents of BUAT 135 may be altered on a cycle-by-cycle basis to enforce congestion control schemes. The manner in which network manager 140 assigns BUs to bus components is described in more detail below with respect to FIGS. 8–9.

Figure 2:
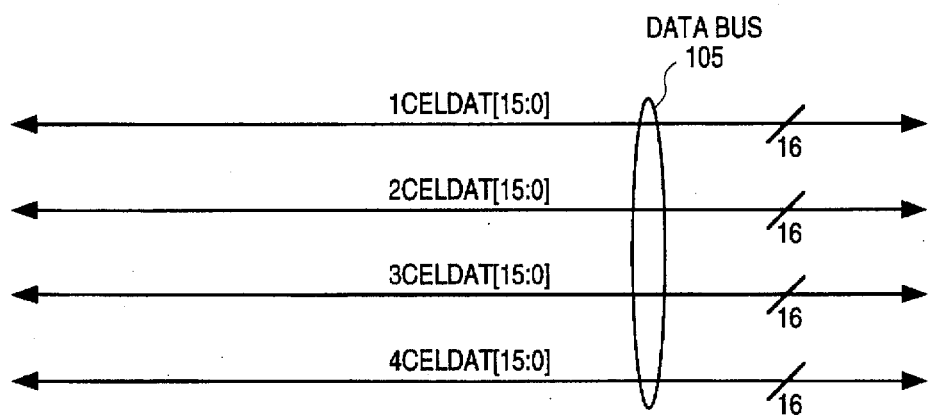
FIG. 2 shows a data bus of the system in more detail.
Figure 5:
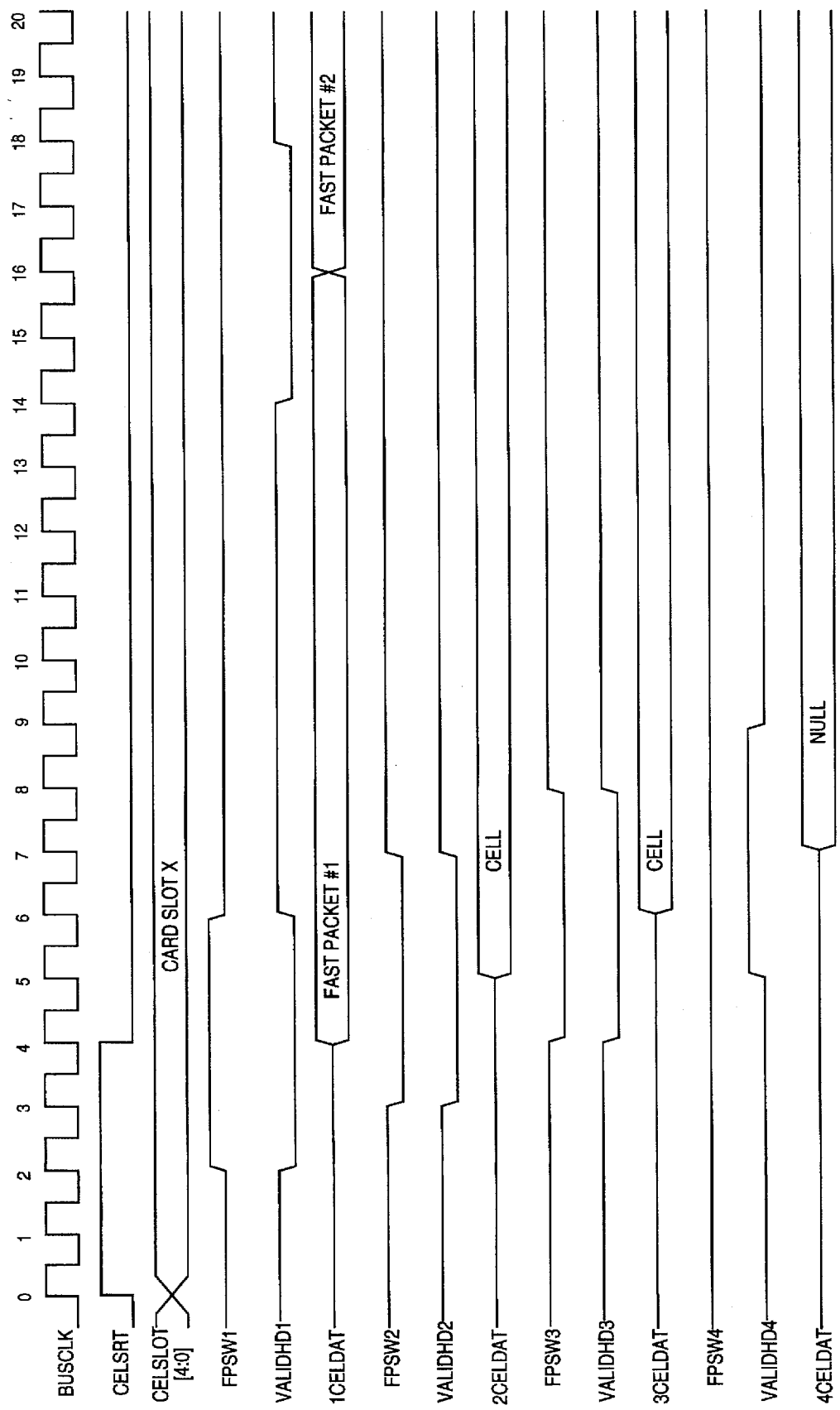
FIG. 5 is a timing diagram showing an exemplary bus transaction for the system described in FIGS. 1–4.

FIG. 2 shows the signal lines of data bus 105 in more detail. As described above, data bus 105 comprises a 64-bit data path that is subdivided into four independent cell highways, which are shown as nCELDAT[15:0], (n=1, 2, 3, or 4). Only one port card is enabled to use the cell highways during a given BU, and that port card may use one or more of the cell highways to transmit data. When using multiple cell highways, the commencement of data transmission is delayed by one clock period for each cell highway. For example, data transmission on 2CELDAT[15:0] begins one clock period after data transmission begins on 1CELDAT[15:0], one clock period before data transmission begins on 3CELDAT[15:0], and two clock period before data transmission begins on 4CELDAT[15:0]. This aspect of the present embodiment is shown in FIG. 5, which is discussed below.

Skewing the beginning of data transmission as between cell highways allows slower speed logic to be implemented by a receiving port card for determining whether the fast packets or ATM cells are destined for that port card. As previously described, each port card monitors data bus 105 to determine whether to accept the fast packets or cells carried by data bus 105. Wherein data bus 105 comprises n independent cell highways, each cell highway may have fast packets or cells destined for a different port card. A port card must therefore be supplied with circuitry for reading the header information for n cell highways. If all cell highways were allowed to begin transmission at precisely the same time, each port card would have to be able to perform the monitoring function at n times the frequency of BUSCLK. By skewing the commencement of data transmission by one BUSCLK period for each of the n cell highways, the monitoring function may be performed at the frequency of BUSCLK because only one decision need be made per BUSCLK period.

Figure 3:
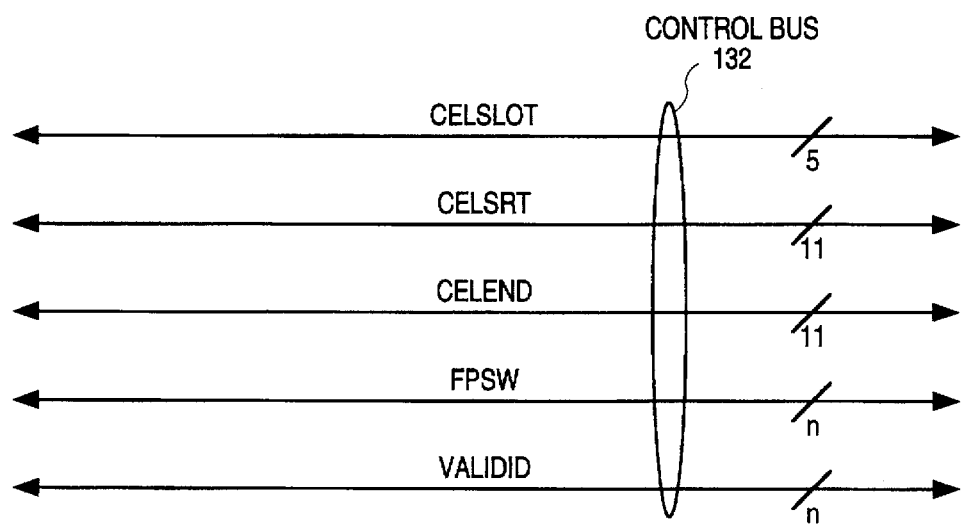
FIG. 3 shows a control bus of the system in more detail.

FIG. 3 shows the signal lines of control bus 132. Control bus 132 generally comprises the following signals:

| | |
|---|---|
| CELSLOT[4:0] | The "CELL SLOT" signal is a 5-bit slot address value asserted by BUC 430 to indicate which port card will control data bus 405 during the next bandwidth unit. |
| CELSRT | The "CELL START" signal is asserted by BUC 430 four clock cycles prior to the beginning of the next bandwidth unit for a duration of four clock cycles. |
| CELEND | The "CELL END" signal is asserted by BUC 430 eight clock cycles prior to the end of the current bandwidth unit for a duration of four clock cycles. |
| FPSWn (n = 1, 2, 3, 4) | A "FAST PACKET SWITCH" signal is driven by the transmitting port card for each cell highway to indicate whether cell highway is transferring fast packets or ATM cells. A logic high FPSWn signal indicates fast packets, and a logic low FPSWn signal indicates an ATM cell. An FPSWn signal remains tri-stated if no data is to be driven on nCELDAT. |
| VALIDHDn (n = 1, 2, 3, 4) | A "VALID HEADER" signal is asserted logic low by the transmitting port card for each cell highway to indicate when valid fast packets or cells are be driven on a cell highway so that receiving port cards may read the header information of the fast packets or cells. A VALIDHDn signal is otherwise tri-stated. |

All of the signals of control bus 132 are clocked in response to the rising edge of the BUSCLK signal.

Figure 4:
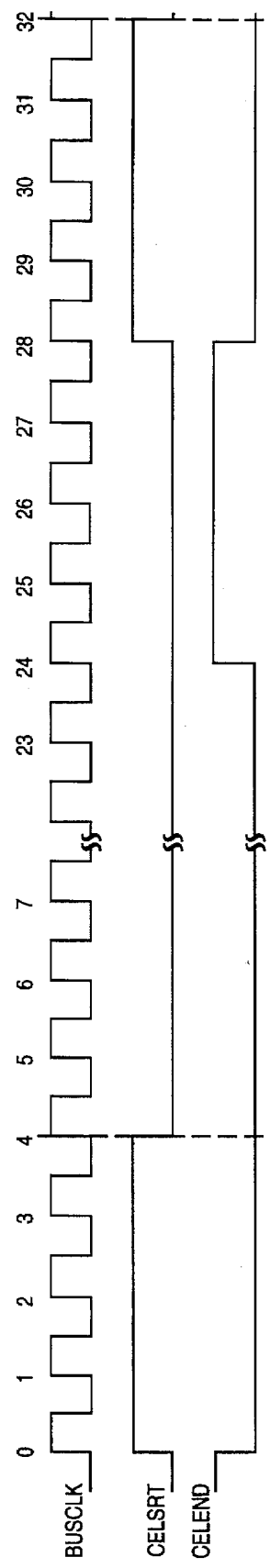
FIG. 4 is a timing diagram showing a manner in which bandwidth units may be allocated.

According to the present embodiment, the CELSRT and CELEND signals are used to indicate the beginning and end of BUs, and FIG. 4 shows a timing diagram for signaling the beginning and end of a bandwidth unit. BUC 130 begins to assert the CELSRT signal for four clock cycles at clock cycle zero. BUC 130 deasserts the CELSRT signal at clock cycle 4 to indicate the beginning of a bandwidth unit during which data is to be transferred between port cards. At clock cycle 24, which is eight clock cycles prior to the end of the bandwidth unit, BUC 130 begins to assert the CELEND signal for four clock cycles until clock cycle 28, whereupon the CELEND signal is deasserted and the CELSRT signal is asserted. The next bandwidth unit may begin at clock cycle 32. For a BU that is not allocated, the CELSRT signal is not asserted during the four clock cycles prior to the beginning of the BU.

FIG. 5 shows a multiple cell highway transmission according to the present embodiment. Specifically, the example of FIG. 5 shows a bandwidth unit wherein a port card uses only three cell highways, 1CELDAT–3CELDAT. At BUSCLK period 0, the CELSRT signal is asserted to signal that the BU is to begin at BUSCLK period 4, and the CELSLOT[4:0] signal lines are asserted at the same time to indicate which port card is granted control of data bus 105 during the BU.

For 1CELDAT (cell highway 1), the transmitting port card drives the FPSW1 signal high and the VALIDHD1 signal low at BUSCLK period 2 to indicate that fast packets are to be transmitted on cell highway 1 during the BU. The transmitting port card begins transmission of the first fast packet over cell highway 1 at BUSCLK period 4. The transmitting port card again drives the VALIDHD1 low at BUSCLK period 14 to indicate that the second fast packet is going to be driven over cell highway 1 at BUSCLK period 16. For 2CELDAT (cell highway 2), the transmitting port card drives the FPSW2 signal low and the VALIDHD2 signal low at BUSCLK period 3 to indicate that an ATM cell is to be transmitted on cell highway 3 during the BU. The transmitting port card begins transmission of the first fast packet over cell highway 2 at BUSCLK period 5. For 3CELDAT (cell highway 3), the transmitting port card drives the FPSW3 signal low and the VALIDHD3 signal low at BUSCLK period 4 to indicate that an ATM cell is to be transmitted on cell highway 3 during the BU. The transmitting port card begins transmission of the first fast packet over cell highway 3 at BUSCLK period 6. For 4CELDAT (cell highway 4), the FPSW4 and VALDHD4 remain tri-stated, and null data is transmitted over cell highway 4 for the BU to maintain parity.

Assigning Bandwidth Units

Figure 6:
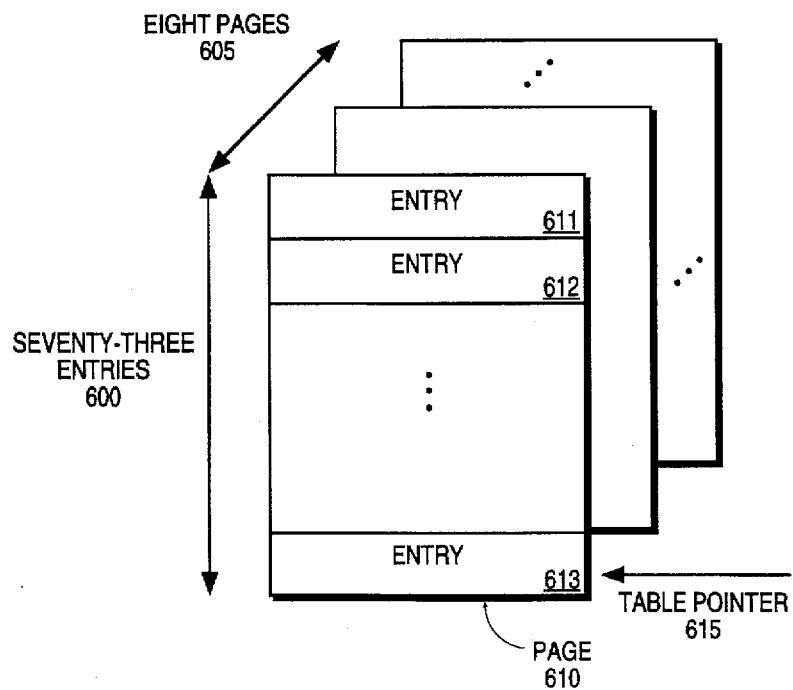
FIG. 6 is a block diagram showing an exemplary organization of the BUAT.

Before discussing the manner in which network manager 140 assigns bandwidth units, the organization of BUAT 135 according to one embodiment is described. FIG. 6 shows BUAT 135 as being organized into eight (8) pages 600 that each include seventy-three (73) entries, wherein a table pointer 615 points at the next table entry. Therefore, according to the present embodiment, a total of 584 BUs are provided per transmission cycle, and each transmission cycle is approximately 36.624 microseconds in duration.

Figure 7:
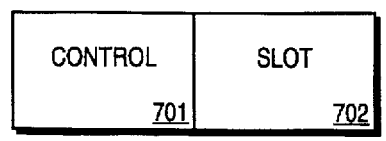
FIG. 7 is a block diagram showing an exemplary organization of a table entry.

FIG. 7 shows an entry 700 for BUAT 135 as including a control (CTRL) field 701 and a SLOT field 702. The CTRL field 701 indicates whether the corresponding bandwidth unit is assigned or unassigned, and the SLOT field 702 indicates the slot number of the transmitting port card. Slot field 702 is only read by BUC 130 if the control field 701 indicates that the bandwidth unit to which entry 700 corresponds is assigned to a port card. According to the present embodiment, the maximum number of BUs that a port card may request per cycle is forty-eight (48), and the maximum aggregate number of BUs that the port cards can request may not exceed the total number of BUs available in a single cycle. The total number of pages in BUAT 135, the total number of table entries in BUAT 135, and the number of bandwidth units required by each port card are communicated as configuration information to network manager 140 by switch 100.

As described above, network manager 140 assigns the transmission opportunities of a transmission cycle by manipulating the entries of BUAT 135, and there are a number of alternative methods for spreading the BUs of a port cards evenly across a transmission cycle. For example, for low bandwidth port cards that require one or fewer BUs per page, network manager 140 may assign one BU per page such that the time between each BU and a next BU is approximately equal to n/b pages, wherein n is the number of pages in BUAT 135 and b is the number of BUs the port card requires. Alternatively, for high bandwidth port cards that require multiple BUs per page or for low bandwidth port cards wherein the quotient n/b is not an integer, network manager 140 may assign BUs such that the time between each BU and a next BU is approximately equal to e/b, wherein e is the total number of entries in a transmission cycle.

Figure 8:
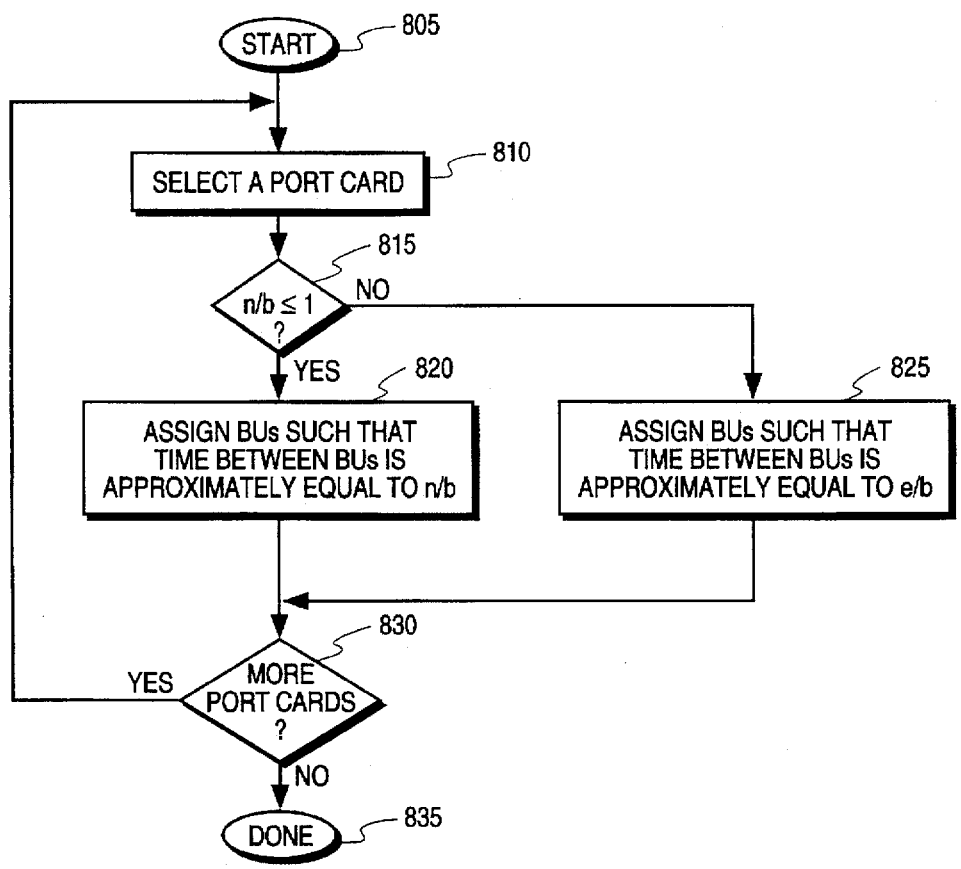
FIG. 8 is flow chart showing one method for automatically spreading the transmission opportunities of a system component evenly over a transmission cycle.

FIG. 8 is a flow chart showing one process for assigning BUs to port cards. The process begins at block 805. The process may begin in response to network manager 140 detecting a change in the configuration of switch 100. At process block 810, network manager 140 selects a first port card to begin assigning BUs. The order in which port cards are selected may be determined by their slot number, their relative bandwidth requirements, or any other reasonable characteristics. At process block 815, network manager 140 determines whether e/b for the selected port card is less than or equal to one. If e/b is less than or equal to one, then the selected port card requires one or fewer BUs per page of BUAT 135, and at process block 820 network manager 140 assigns BUs such that the time between assigned BUs for the selected port card is approximately equal to e/b. If e/b is greater than one, then the selected port card requires more than one BU for at least one page of BUAT 135, and at process block 825 network manager 140 assigns BUs such that the time between assigned BUs is approximately equal to e/b. After the BUs for the selected port card have been assigned at process block 820 or process block 825, network manager 140 determines if there are more port cards for which bandwidth must be assigned. If there are more port cards, process blocks 810–830 are repeated until BUs have been assigned for all port cards, whereupon the process ends at process block 835.

Network manager 140 may assign BUs for each port card by computing the proper placement of BUs in response to a well-defined set of rules. Alternatively, network manager may store a mapping table that defines the preferred spacing of a given number of requested BUs across the transmission cycle. Performing lookups using mapping tables is in many ways preferable because the amount of time required to assign BUs is always known. When assignment algorithms are used instead of mapping tables, it is preferable that the assignment algorithms be as simple as possible in order to reduce and/or fix the amount of time required to assign BUs.

For example, according to a present embodiment, high bandwidth cards that require multiple BUs per page are assigned BUs according to a simple counting "wrap-around" algorithm wherein the network manager cycles through the BUs of a page by checking every third BU for availability. If a BU is available, that BU is assigned to a card for all pages. By checking every third BU, the count will "wrap-around" to a previously unchecked BU after the end of the page has been reached. For example, if the first pass through the page checked BUs 1, 4, 7, 10, etc., for availability, the second pass through the page would check BUs 2, 5, 8, 11, etc. If the number of BUs to be assigned to a card is not an integer multiple of the number of pages in the table, some of the BUs (i.e., the integer portion of e/b) are assigned using the wrap-around algorithm, and the remaining BUs (i.e., the remainder portion of e/b) are assigned using mapping table lookups.

FIG. 9 shows an example of a mapping table that may be used to assign BUs for low bandwidth port cards. More specifically, FIG. 9 shows a mapping table 900 wherein n is equal to eight and b may be any integer from one to eight. For a given value of b, an "x" indicates a page wherein a BU for the port card will be placed. For example, wherein b is equal to two, BUs are assigned in the first and fifth pages. Similarly, wherein b is equal to five, BUs are assigned in the first, second, fourth, fifth, and seventh pages. Many alternative equivalent mapping tables may be determined, and a set of rules may be defined in view of the equivalent mapping tables so that network manager 140 may compute the proper placement rather than using mapping tables. Similar mapping tables may be defined for high bandwidth cards wherein b is mapped versus e.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A data processing system comprising:

a data bus subdivided into a plurality of independent data paths;

a plurality of system components coupled to the data bus, each system component monitoring each independent data path of the data bus to determine whether that system components is to receive data transmitted via that independent data path; and an allocation control circuit coupled to the system components, the allocation control circuit allocating a transmission opportunity spanning multiple bus clock cycles to a first system component such that the first system component is enabled to transmit data via any and all of the independent data paths during the transmission opportunity, the allocation control circuit enabling the first system component to begin transmission of data over the data paths at different clock cycles of the transmission opportunity such that the plurality of system components need monitor only one independent data path per bus clock cycle.

2. A data processing system comprising:

a time division multiplexed (TDM) data bus, the TDM data bus being subdivided into a plurality of independent data paths;

a plurality of system components coupled to the TDM data bus each system component monitoring each independent data path of the data bus to determine whether that system components is to receive data transmitted via that independent data path; and an allocation control circuit coupled to the system components, the allocation control circuit allocating a contiguous group of TDM timeslots called a bandwidth unit (BU) to a first system component, wherein the first system component is thereafter enabled to transmit data via any and all of the plurality of independent data paths, the first system component skewing transmission of data over the plurality of independent data paths such that transmission is initiated on each independent data path during a different timeslot of the BU.

3. The data processing system of claim 2, wherein the allocation control circuit enables transmission of data for each independent data path of the TDM data bus during a different timeslot of the BU.

4. The data processing system of claim 2, wherein data transmission is skewed by one timeslot for each data path.

5. A method for transmitting data in a data processing system that comprises a data bus subdivided into a plurality of independent data paths and a plurality of system components coupled to the data bus, each system component monitoring each independent data path of the data bus to determine whether that system components is to receive data transmitted via that independent data path, the method comprising:

allocating a transmission opportunity spanning multiple bus clock cycles to a first system component such that the first system component is enabled to transmit data via any and all of the independent data paths during the transmission opportunity; and enabling the first system component to begin transmission of data over the data paths at different clock cycles of the transmission cycle such that the plurality of system components need monitor only one independent data path per clock cycle.

* * * * *